United States Patent [19]

Frohn

[11] Patent Number: 4,484,701
[45] Date of Patent: Nov. 27, 1984

[54] CASSETTE TAPE RACK

[76] Inventor: Paul R. Frohn, 164 Reynolds Bridge Rd., Thomaston, Conn. 06787

[21] Appl. No.: 554,891

[22] Filed: Nov. 25, 1983

[51] Int. Cl.$^3$ ............................................ B65D 85/672
[52] U.S. Cl. .................................... 224/273; 206/387; 224/312
[58] Field of Search ............ 224/273, 311, 312, 42.42; 206/387

[56] References Cited

U.S. PATENT DOCUMENTS

| | | | |
|---|---|---|---|
| 3,717,188 | 2/1973 | Green | 206/387 X |
| 3,730,581 | 5/1973 | Parkinson | 224/273 X |
| 4,241,859 | 12/1980 | Eames | 224/312 |
| 4,253,567 | 3/1981 | Goldammer | 206/387 |
| 4,273,277 | 6/1981 | Stone | 224/312 |
| 4,285,554 | 8/1981 | Bell et al. | 224/312 X |

FOREIGN PATENT DOCUMENTS 1052337  4/1979  Canada ................................. 224/311

Primary Examiner—Steven M. Pollard
Attorney, Agent, or Firm—Lawrence Hager

[57] ABSTRACT

A cassette tape rack construction including a backboard adapted for being readily mounted, for example, on the interior door panel of an automobile at a predetermined elevation generally below the door arm rest member and having a plurality of individual pockets or compartments. Each pocket being configured for providing an individual cassette storage compartment protruding outwardly from the backboard to enable selective positional/compartment storage of one or more cassettes and to facilitate visual and/or tactile location retrieval of a desired cassette tape.

8 Claims, 5 Drawing Figures

CASSETTE TAPE RACK

FIELD OF THE INVENTION

The invention relates generally to storage racks and the like and, in particular, to a cassette storage rack.

BACKGROUND OF THE INVENTION

Typically, cassette tapes are placed in a tray like receptacle or in the so called glove compartment of an automobile or other similar receptacle where the cassettes are maintained. The apparent shortcomings of storage in this manner are that the individual cassettes are not readily distinguishable and are not individually protected from damage.

In contrast to the prior art, the present invention provides a cassette tape rack(s) which is mountable on, for example, a car door or dashboard and is positionable and configured for providing individual compartments for cassette tapes to enable selective compartment storage of a cassette to facilitate visual and/or tactile location, identification and retrieval of a desired cassette tape.

SUMMARY OF THE INVENTION

Generally speaking, in accordance with the invention, a cassette tape rack is provided comprising:

backboard means (11) adapted for being mountable on a door panel or dashboard surface of an automobile; and a plurality of individual compartment means (12-16) affixed to said backboard means and being configured for each to enable an individual cassette to be placed therein to facilitate visual and/or tactile location or retrieval of each cassette.

Accordingly, it is an object of the present invention to provide a new and improved cassette tape rack.

a further object of the invention is to provide a cassette tape rack readily mountable to a door panel or dashboard of an automobile.

a further object of the invention is to provide a cassette tape rack to enable individual compartmentalized storage of a plurality of cassette tapes.

a further object of the invention is to provide a cassette tape rack to facilitate visual and/or tactile location and retrieval of one or more cassette tapes.

BRIEF DESCRIPTION OF THE DRAWINGS

Other objects and advantages of this invention may be seen more clearly from the following description when viewed in conjunction with the accompanying drawings. Like numerals refer to like parts throughout.

DESCRIPTION OF THE PREFERRED EMBODIMENTS

Figure 1:
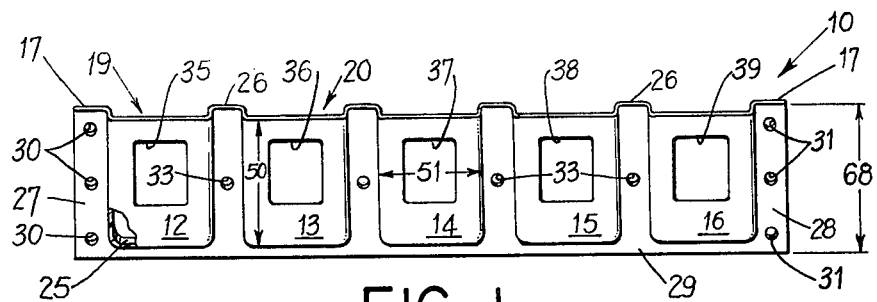
FIG. 1 is a front perspective view of one preferred embodiment of the cassette tape rack in accordance with the invention.
Figure 2:
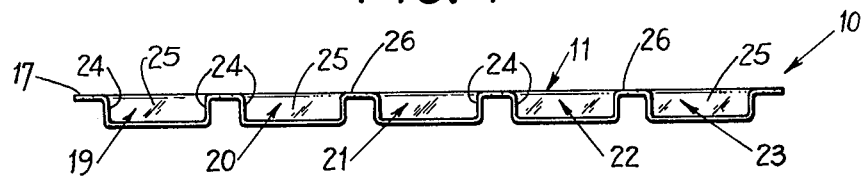
FIG. 2 is a top view of the cassette tape rack shown in FIG. 1.
Figure 5:
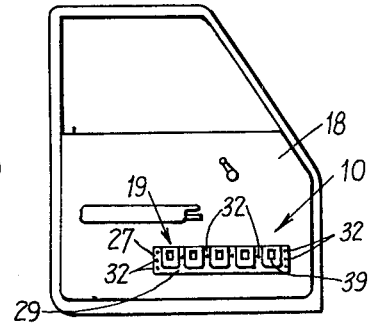
FIG. 5 is a perspective representation, partially cutaway, of a cassette tape rack mounted in accordance with the invention.

With reference to FIGS. 1, 2 and 5, a first embodiment of the invention is shown as comprising a cassette tape rack 10 having a backboard 11, and five spaced apart discrete cassette compartments or pockets 12 through 16. The cassette tape rack 10 may be formed from plastic, or various other resins, or other suitable materials.

The cassette tape rack 10 includes a backboard 11 having flat back surface portions 17 adapted for abutting contact with a mounting surface 18, for example, the interior panel of a car door or a dashboard or on boat and camper wall surfaces or any other suitable surface. Backboard 11 is approximately seventeen inches in length and approximately three and one half inches in height 68 and has a thickness of approximately one-eighth of an inch. Five discrete or individual pockets 12 through 16 extend outwardly from backboard 11 to form five discrete alcoves or recesses 19 through 23, respectively. Each pocket 12 through 16 may be formed integrally, for example, by plastic injection molding process, with backboard 11 and be dimensioned for accommodating or receiving a cassette tape within each respective alcove 19 through 23. For example, each pocket 12 through 16 generally has a height 50 of approximately three inches, width 51 approximately between two and one fourth inch and two and three fourths inches, side 24 and bottom 25 wall portions which extend outwardly from backboard 11 approximately between three eighths of an inch and one inch. The pockets 12 through 16 do not have a back wall portion prior to cassette tape rack 11 being mounted on a selected surface as shown in FIG. 1. The car door panel 18 or other selected mounting surface for the cassette tape rack 10 is utilized as a back wall portion of each pocket 12 through 16 as shown in FIG. 5.

The backboard 11 has intermediate wall portions 26 between pockets 12 and 13, 13 and 14, 14 and 15, 15 and 16; end wall members 27 and 28, and an elongate bottom wall portion 29. One or more, for example, three, holes 30 and 31 are provided in end walls 27 and 28, respectively, each for receiving a mounting pin or screw or rivit 32, which extends into and is affixed in conventional manner to door panel 18. An intermediate mounting hole 33 is provided in each intermediate wall portion 26 for receiving a mounting pin or screw or rivit 34, which extends into and is affixed in conventional manner to door panel 18. The intermediate wall portions 26 each have a width of approximately three-fourths of an inch. In this manner, each pocket 12 through 16 is spaced apart.

Each pocket 12 through 16 has a window or cutout portion 35 through 39, respectively, to facilitate reading of labels on the individual cassette tapes being stored in a respective pocket.

Figure 3:
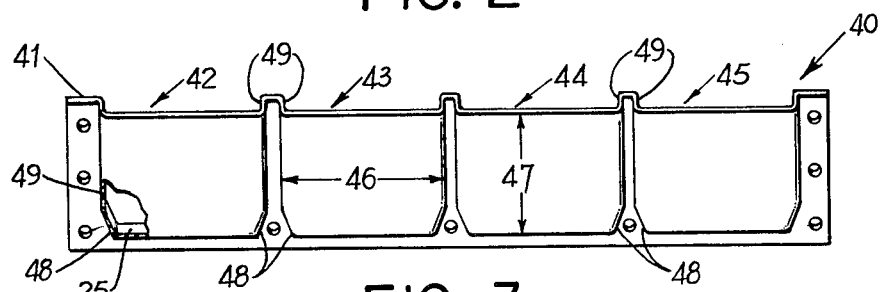
FIG. 3 is a front view of a first alternative embodiment of the cassette tape rack shown in FIGS. 1 and 2, in accordance with the invention.

With reference to FIG. 3, another embodiment of the present invention is illustrated which is similar to that shown in FIGS. 1, 2 and 5, with the exception that cassette tape rack 40 is of different configuration and is dimensioned for receiving/mounting four individual 8-track tapes (not shown).

The backboard 41 has a length of approximately eighteen inches, a height of approximately three and one-half inches, and a thickness of approximately one-eighth of an inch.

Each pocket 42 through 45 has a width 46 of approximately three and one-half inches, a height 47 of approximately three inches, and has contoured bottom corner wall portions 48. Pockets 42 through 45 have side 49 and bottom 25 wall members dimensioned to accommodate a respective 8-track tape cassette thickness with said backboard 41 being mounted on a selected surface 18 as described with reference to FIGS. 1, 2 and 5.

Figure 4:
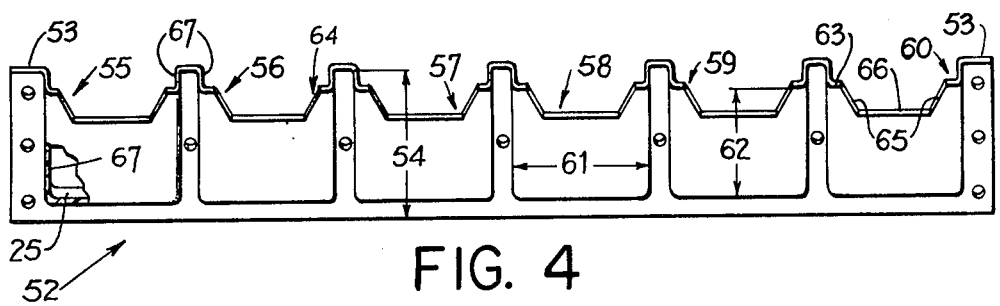
FIG. 4 is a front view of a second alternative embodiment of the cassette tape rack shown in FIGS. 1 and 2, in accordance with the invention.

With reference to FIG. 4, another embodiment of the present invention is illustrated which is similar to the foregoing embodiments, with the exception that the cassette tape rack 52 has a different configuration and is dimensioned for receiving/mounting six separate video tape cassette cartridges (not shown) such as ATARI type game cartridges.

The backboard 53 has a generally rectangular shape with a length of approximately twenty three and one half inches, a height 54 of approximately between three inches and four inches and a thickness of approximately one-eighth inch.

Each pocket 55 through 60 has a width 61 of approximately three and one-eighth inches or three and one-half inches, a height 62 of approximately three and one-eighth inches. The top edge 63 has a cutout slot 64 dimensioned to enable finger contact with the side of a stored cassette tape (not shown) to facilitate removal of such cassette(s) from its respective mounting pocket. Each cutout slot 64 has inwardly sloped side walls 65 and a substantially straight bottom wall edge 66. Each pocket 55 through 60 has side 67 and bottom 25 wall members dimensioned to accommodate a respective video game cartridge or cassette thickness with said rack 52 being mounted on a selected surface 18.

It is to be understood that the above described embodiments are illustrative of the principles of the invention. Other embodiments may be devised by those skilled in the art without departing from the spirit and scope of the ivention. For example, the dimensions and number of cassette pockets and intermediate spacing between such pockets may vary.

I claim:

1. A cassette or 8-track tape cartridge storage rack having particular utility for being mountable on a door panel or dashboard of an automobile for forming a storage compartment, comprising:

rack means having a generally rectangular configuration including a backboard with a plurality of outwardly contoured wall portions for defining respective side and bottom walls about each of a plurality of respective spaced apart outwardly extending front walls, with window means and/or cut out slot means to permit reading of a lable on a cassette or cartridge, to form a plurality of discrete storage compartments each being open at a top and a back region, said backboard having substantially flat back surface portions for abuting with the door panel or dashboard of the automobile and having a first and a second end wall portions each with a plurality of mounting holes therein and having a plurality of intermediate wall portions each being interposed between respective proximate discrete storage compartments with each intermediate wall portion having a mounting hole therein; and a plurality of fastening means each for being inserted into a respective mounting hole and for being fastened onto the door or dashboard of the automobile, whereby said rack means being readily mountable to the door or dashboard of the automobile with the door or dashboard of the automobile forming a back wall member of each respective storage compartment being opened at a top portion thereof.

2. A storage rack as in claim 1, wherein:

five discrete storage compartments are provided each configured to receive an audio tape cassette.

3. A storage rack as in claim 1, wherein:

four discrete storage compartments are provided each configured to receive an eight-track type tape cassette, each storage compartment having a respective front wall with a height of approximately three inches and a width of approximately three and one-half inches and has contoured bottom wall portions.

4. A storage rack as in claim 1, wherein:

six discrete storage compartments are provided each configured to receive a video tape type cassette or cartridge, each storage compartment having a respective front wall with an upper notch portion configured to enable a finger to be inserted for facilitating removal of a cassette or cartridge being stored within the respective storage compartment.

5. A rack as in claim 1, wherein:

the backboard means has substantially flat surface portions for abuting contact with the support surface.

6. A rack as in claim 1, wherein:

the backboard means is formed of a plastic.

7. A rack as in claim 1, wherein:

the backboard means has a length approximately between sixteen inches and twenty-five inches, a height approximately between three inches and five inches, and a thickness of approximately one eighth inch.

8. A rack as in claim 1, wherein:

each of said plurality of separate pocket means is integrally formed with said backboard means, each pocket means protrudes outwardly from said backboard means a distance approximately between three-eighths of an inch and one inch and has a height approximately between three inches and four inches with a width approximately between two inches and four inches.

* * * * *